US011242855B2

(12) United States Patent
Imai et al.

(10) Patent No.: US 11,242,855 B2
(45) Date of Patent: Feb. 8, 2022

(54) ELECTRIC PUMP

(71) Applicant: DENSO CORPORATION, Kariya (JP)

(72) Inventors: Hiroshi Imai, Kariya (JP); Toshihiro Matsuura, Kariya (JP); Toshimasa Kosugi, Kariya (JP); Yuuji Takemura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/978,240

(22) PCT Filed: Mar. 4, 2019

(86) PCT No.: PCT/JP2019/008451
§ 371 (c)(1),
(2) Date: Sep. 4, 2020

(87) PCT Pub. No.: WO2019/172196
PCT Pub. Date: Sep. 12, 2019

(65) Prior Publication Data
US 2021/0003132 A1 Jan. 7, 2021

(30) Foreign Application Priority Data
Mar. 5, 2018 (JP) .............................. JP2018-038295

(51) Int. Cl.
*F04D 13/06* (2006.01)
*F04D 29/42* (2006.01)
(Continued)

(52) U.S. Cl.
CPC ......... *F04D 13/06* (2013.01); *F04D 13/0606* (2013.01); *F04D 29/086* (2013.01);
(Continued)

(58) Field of Classification Search
CPC .... F04D 13/0686; F04D 29/426; F04D 13/06; F04D 29/086; F04D 29/624;
(Continued)

(56) References Cited

U.S. PATENT DOCUMENTS

| 5,049,770 A | * | 9/1991 | Gaeth | ..................... F02B 63/06 310/89 |
| 6,755,349 B2 | * | 6/2004 | Beidokhti | .............. B05B 17/08 239/16 |

(Continued)

FOREIGN PATENT DOCUMENTS

| JP | 2008-211960 A | | 9/2008 |
| JP | 2008211960 A | * | 9/2008 |

(Continued)

*Primary Examiner* — Dominick L Plakkoottam
(74) *Attorney, Agent, or Firm* — Oliff PLC

(57) ABSTRACT

At an electric pump, a first gasket is interposed between a stator and a motor housing, and a supporting member, and a second gasket is interposed between the supporting member and a substrate housing. Further, the electric pump has a first snap-fit structure that assembles the stator to the supporting member, a second snap-fit structure that assembles the motor housing the supporting member, and a third snap-fit structure that assembles the substrate housing to the supporting member.

4 Claims, 13 Drawing Sheets

(51) Int. Cl.
*F04D 29/62* (2006.01)
*F04D 29/08* (2006.01)
*H02K 11/33* (2016.01)
*H02K 5/22* (2006.01)
*H02K 7/14* (2006.01)

(52) U.S. Cl.
CPC ......... *F04D 29/426* (2013.01); *F04D 29/628* (2013.01); *H02K 5/225* (2013.01); *H02K 7/14* (2013.01); *H02K 11/33* (2016.01)

(58) Field of Classification Search
CPC ... F04D 13/0606; F04D 29/628; H02K 5/225; H02K 5/10; H02K 5/04
See application file for complete search history.

(56) References Cited

U.S. PATENT DOCUMENTS

| | | | | |
|---|---|---|---|---|
| 7,318,422 | B2 * | 1/2008 | Douyama | F04B 17/03 123/495 |
| 8,803,390 | B2 * | 8/2014 | Uchida | H02K 5/04 310/89 |
| 9,541,090 | B2 * | 1/2017 | Hoj | F04D 13/0626 |
| 9,543,803 | B2 * | 1/2017 | Hoj | F04D 13/0693 |
| 9,546,663 | B2 * | 1/2017 | Hoj | H02K 7/14 |
| 10,047,751 | B2 * | 8/2018 | Hoj | F04D 29/5893 |
| 10,830,251 | B2 * | 11/2020 | Castillo | F04D 5/002 |
| 10,859,086 | B2 * | 12/2020 | Trentin | F04D 1/02 |
| 2010/0090635 | A1 * | 4/2010 | Andersen | H02K 5/10 318/490 |
| 2020/0271121 | A1 * | 8/2020 | Arnoldi | F04D 13/0653 |

FOREIGN PATENT DOCUMENTS

| | | | |
|---|---|---|---|
| JP | 2010-275972 | A | 12/2010 |
| JP | 5161636 | B2 | 3/2013 |
| JP | 2013-090376 | A | 5/2013 |
| JP | 2016-067190 | A | 4/2016 |
| JP | 6012154 | B2 | 10/2016 |

* cited by examiner

ELECTRIC PUMP

TECHNICAL FIELD

The present disclosure relates to an electric pump.

BACKGROUND ART

The following structure is known as an electric pump (refer to Japanese Patent No. 5161636 for example). Namely, a known electric pump has an impeller, a motor section, a pump housing, a motor housing, a circuit board, and a substrate housing.

The motor section has a rotor that is fixed to the impeller, and a stator that is provided at the radial direction outer side of the rotor. The pump housing has a pump chamber that accommodates the impeller. The motor housing has an inner tube portion that accommodates the rotor at the inner side, and an outer tube portion that is provided at the radial direction outer side of the inner tube portion and accommodates the stator between the inner tube portion and the outer tube portion.

The circuit board is disposed at the side of the motor housing which is opposite the pump housing. The substrate housing is disposed at the side of the circuit board which is opposite the motor housing, and accommodates the circuit board. In this electric pump, the pump housing, the motor housing and the substrate housing are assembled integrally.

SUMMARY OF INVENTION

Technical Problem

There are cases in which waterproof performance and low vibration performance are required as basic performances of an electric pump such as that described above. Further, there are cases in which assembly being easy, and rattling of members after assembly not arising, are required of an electric pump that is structured from plural members such as described above.

The present disclosure was made in view of the above-described issues, and an object thereof is to provide an electric pump at which waterproof performance and low vibration performance can be ensured, and whose assembly is easy, and moreover, at which rattling of members after assembly can be suppressed.

Solution to Problem

An electric pump relating to a first aspect of the present disclosure comprises: an impeller; a motor section having a rotor that is fixed to the impeller, and a stator that is provided at a radial direction outer side of the rotor; a pump housing having a pump chamber that accommodates the impeller; a motor housing having an inner tube portion that accommodates the rotor at an inner side, and an outer tube portion that is formed at a radial direction outer side of the inner tube portion and accommodates the stator between the inner tube portion and the outer tube portion; a supporting member that is disposed at a side of the motor housing which is opposite the pump housing; a circuit board that is disposed at a side of the supporting member which is opposite the motor housing; a substrate housing that is disposed at the side of the supporting member which is opposite the motor housing, and that accommodates the circuit board; a first gasket that is interposed between the stator and the motor housing, and the supporting member; a second gasket that is interposed between the supporting member and the substrate housing; a first snap-fit structure having a first anchoring portion that is formed at the stator, and a first elastic piece that is formed at the supporting member and has a first anchored portion that is anchored at the first anchoring portion; a second snap-fit structure having a second anchoring portion that is formed at the motor housing, and a second elastic piece that is formed at the supporting member and has a second anchored portion that is anchored at the second anchoring portion; and a third snap-fit structure having a third anchoring portion that is formed at the supporting member, and a third elastic piece that is formed at the substrate housing and has a third anchored portion that is anchored at the third anchoring portion.

In accordance with this electric pump, the first gasket is interposed between the stator and the motor housing, and the supporting member, and the second gasket is interposed between the supporting member and the substrate housing. Accordingly, water entering-in from between the stator and the motor housing, and the supporting member, and from between the supporting member and the substrate housing, can be obstructed by the first gasket and the second gasket. Due thereto, the waterproof performance can be ensured.

Further, as described above, the first gasket is interposed between the stator and the motor housing, and the supporting member, and the second gasket is interposed between the supporting member and the substrate housing. Therefore, even if vibrations that are generated at the stator at the time when the motor section operates are transmitted to the motor housing, these vibrations can be absorbed by the first gasket and the second gasket. Due thereto, a low vibration performance can be ensured.

Moreover, the first snap-fit structure is provided at the stator and the supporting member, and the second snap-fit structure is provided at the motor housing and the supporting member, and the third snap-fit structure is provided at the supporting member and the substrate housing.

Further, at the first snap-fit structure, the stator is assembled to the supporting member due to the first anchored portion of the first elastic piece, which is formed at the supporting member, being anchored at the first anchoring portion that is formed at the stator.

Further, at the second snap-fit structure, the motor housing is assembled to the supporting member due to the second anchored portion of the second elastic piece, which is formed at the supporting member, being anchored at the second anchoring portion that is formed at the motor housing.

Moreover, at the third snap-fit structure, the substrate housing is assembled to the supporting member due to the third anchored portion of the third elastic piece, which is formed at the substrate housing, being anchored at the third anchoring portion that is formed at the supporting member.

In this way, because the stator, the motor housing and the substrate housing are assembled to the supporting member by using the first snap-fit structure, the second snap-fit structure and the third snap-fit structure, assembly can be made to be easy.

Moreover, as described above, the first gasket is interposed between the stator and the motor housing, and the supporting member, and the second gasket is interposed between the supporting member and the substrate housing. Accordingly, due to the elastic forces of the first gasket and the second gasket, loads are applied in directions in which the anchoring forces (hooking forces) increase, between the first anchoring portion and the first anchored portion, and between the second anchoring portion and the second anchored portion, and between the third anchoring portion and the third anchored portion. Due thereto, rattling of the members after assembly, and in other words and more specifically, rattling of the stator, the supporting member, the motor housing and the substrate housing, can be suppressed.

In an electric pump relating to a second aspect of the present disclosure, in the electric pump relating to the first aspect, a cut-out portion, which is a shape of being cut-out from a substrate housing side, is formed in the second elastic piece, the cut-out portion and the third anchoring portion are at a same position in a peripheral direction of the supporting member, and the third anchored portion is anchored at the third anchoring portion in a state in which the third elastic piece is inserted in an inner side of the cut-out portion.

In accordance with this electric pump, the cut-out portion that is formed in the second elastic piece, and the third anchoring portion, are at the same position in the peripheral direction of the supporting member. In the state in which the third elastic piece is inserted in the inner side of the cut-out portion, the third anchored portion is anchored at the third anchoring portion. Accordingly, because the second snap-fit structure and the third snap-fit structure can be gathered at the same place in the peripheral direction of the supporting member, the structure of the outer peripheral portion of the electric pump can be made to be simple as compared with a case in which, for example, the second snap-fit structure and the third snap-fit structure are respectively provided at different places in the peripheral direction of the supporting member.

In an electric pump relating to a third aspect of the present disclosure, in the electric pump relating to the second aspect, the first elastic piece is disposed further toward a radial direction inner side of the supporting member than the second elastic piece and the third elastic piece, and the first anchoring portion, the first anchored portion, the second anchoring portion, the second anchored portion, the third anchoring portion and the third anchored portion are disposed within a range in a length direction of the second elastic piece that runs along an axial direction of the supporting member.

In accordance with this electric pump, the first elastic piece is disposed further toward the radial direction inner side of the supporting member than the second elastic piece and the third elastic piece. The first anchoring portion, the first anchored portion, the second anchoring portion, the second anchored portion, the third anchoring portion and the third anchored portion are disposed within a range in the length direction of the second elastic piece. Accordingly, the electric pump can be made to be compact in the axial direction as compared with a case in which, for example, the first elastic piece is formed so as to be lined-up in the axial direction of the supporting member with the second elastic piece and the third elastic piece, and the first anchoring portion and the first anchored portion are outside of the range in the length direction of the second elastic piece.

In an electric pump relating to a fourth aspect of the present disclosure, in the electric pump of any one of the first through third aspects, the stator has a stator core, and a stator yoke, the stator core being press-fit into an inner side of the stator yoke, the supporting member has a cylindrical portion, and an annular convex portion that is formed at an outer peripheral surface of the cylindrical portion, the stator yoke, the outer tube portion, and a peripheral wall portion of the substrate housing are positioned at a radial direction outer side of the cylindrical portion, the stator yoke and the outer tube portion face the annular convex portion from an axial direction first side of the annular convex portion, the peripheral wall portion faces the annular convex portion from an axial direction second side of the annular convex portion, the first gasket is interposed between the stator yoke and the outer tube portion, and the annular convex portion, the second gasket is interposed between the peripheral wall portion and the annular convex portion, and an inner peripheral surface of the first gasket and an inner peripheral surface of the second gasket are respectively fit tightly to the outer peripheral surface of the cylindrical portion over an entire periphery.

In accordance with this electric pump, the first gasket is interposed between the stator yoke and the outer tube portion, and the annular convex portion, and the second gasket is interposed between the peripheral wall portion and the annular convex portion. Further, the inner peripheral surface of the first gasket and the inner peripheral surface of the second gasket are respectively fit tightly to the outer peripheral surface of the cylindrical portion over the entire periphery. Accordingly, foreign matter moving from the inner side space (the motor chamber) of the outer tube portion along the outer peripheral surface of the cylindrical portion into the inner side space (the circuit chamber) of the substrate housing can be inhibited by the first gasket and the second gasket.

DESCRIPTION OF EMBODIMENTS

First Embodiment

Figure 1:
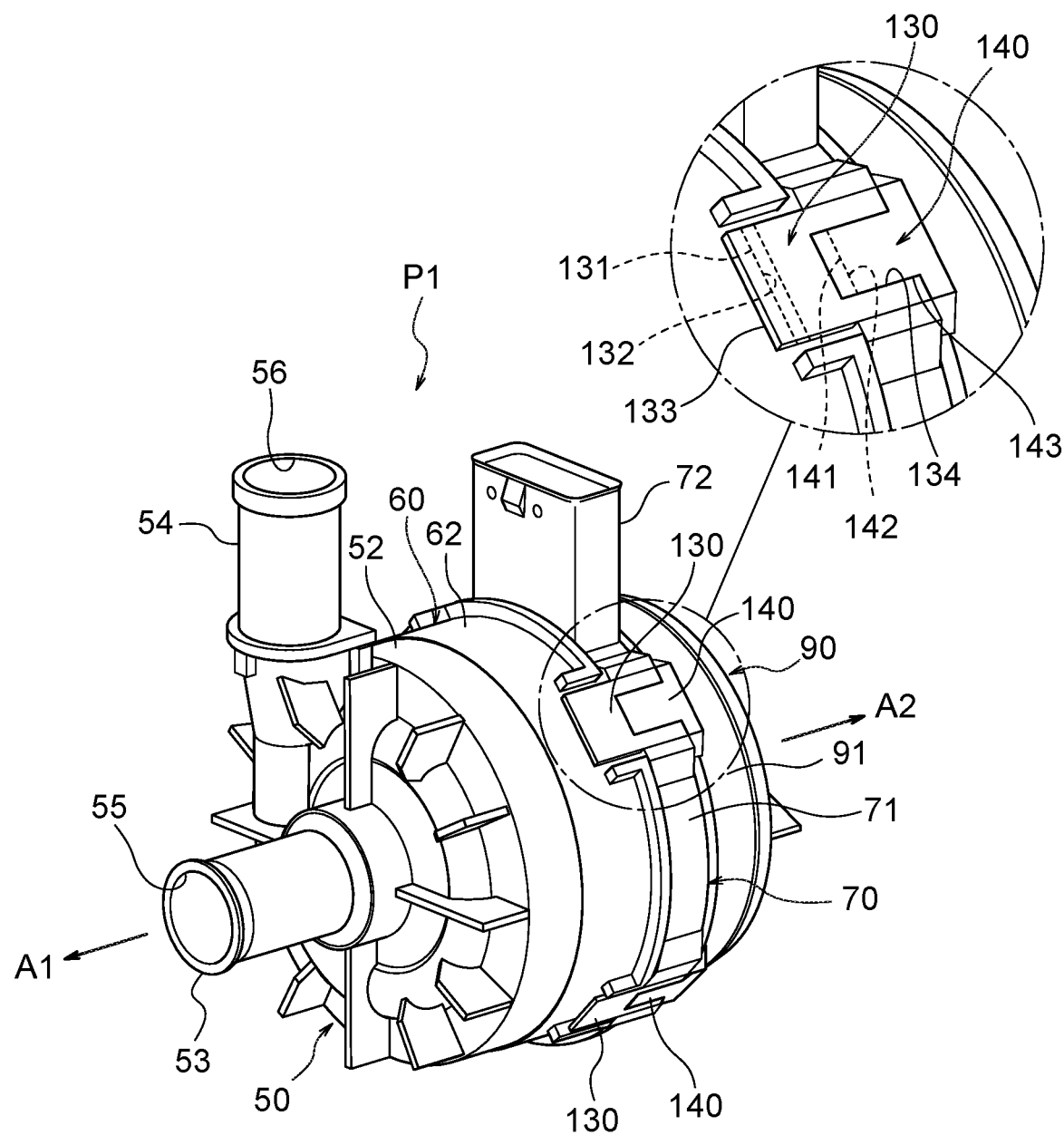
FIG. 1 is a perspective view in which an electric pump relating to a first embodiment of the present disclosure is seen from an axial direction first side.
Figure 2:
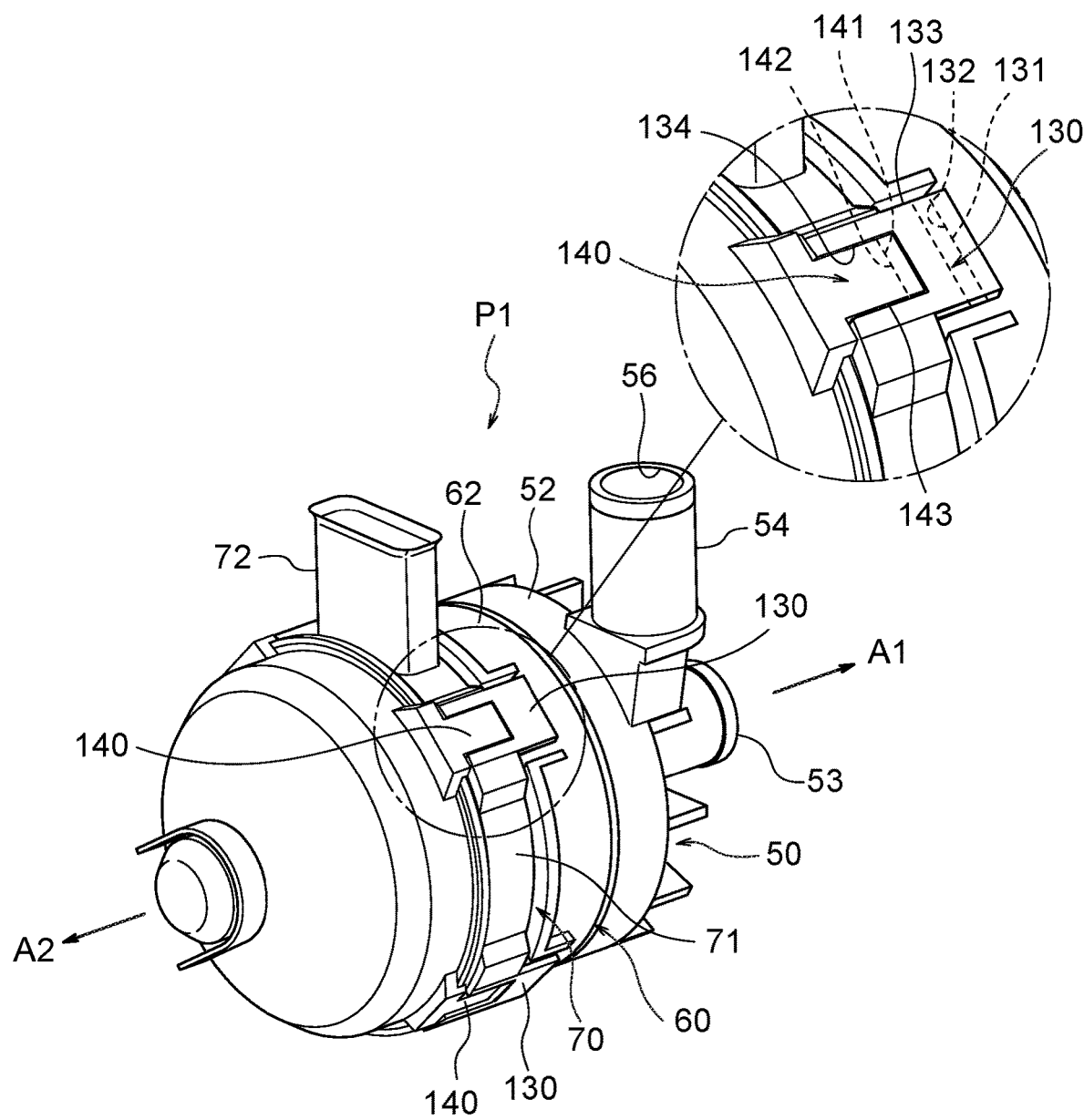
FIG. 2 is a perspective view in which the electric pump of FIG. 1 is seen from an axial direction second side.
Figure 3:
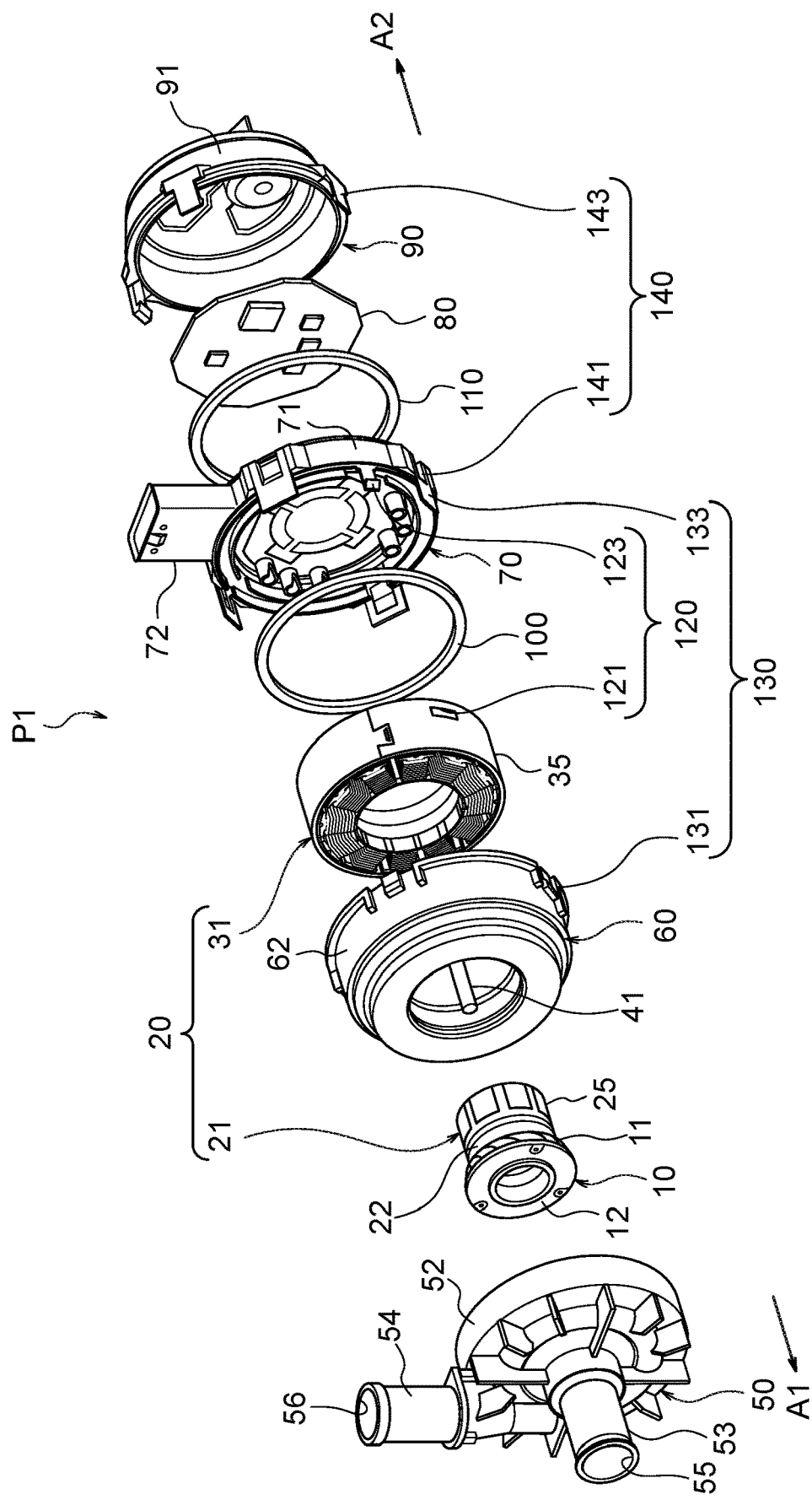
FIG. 3 is an exploded perspective view in which the electric pump of FIG. 1 is seen from the axial direction first side.
Figure 4:
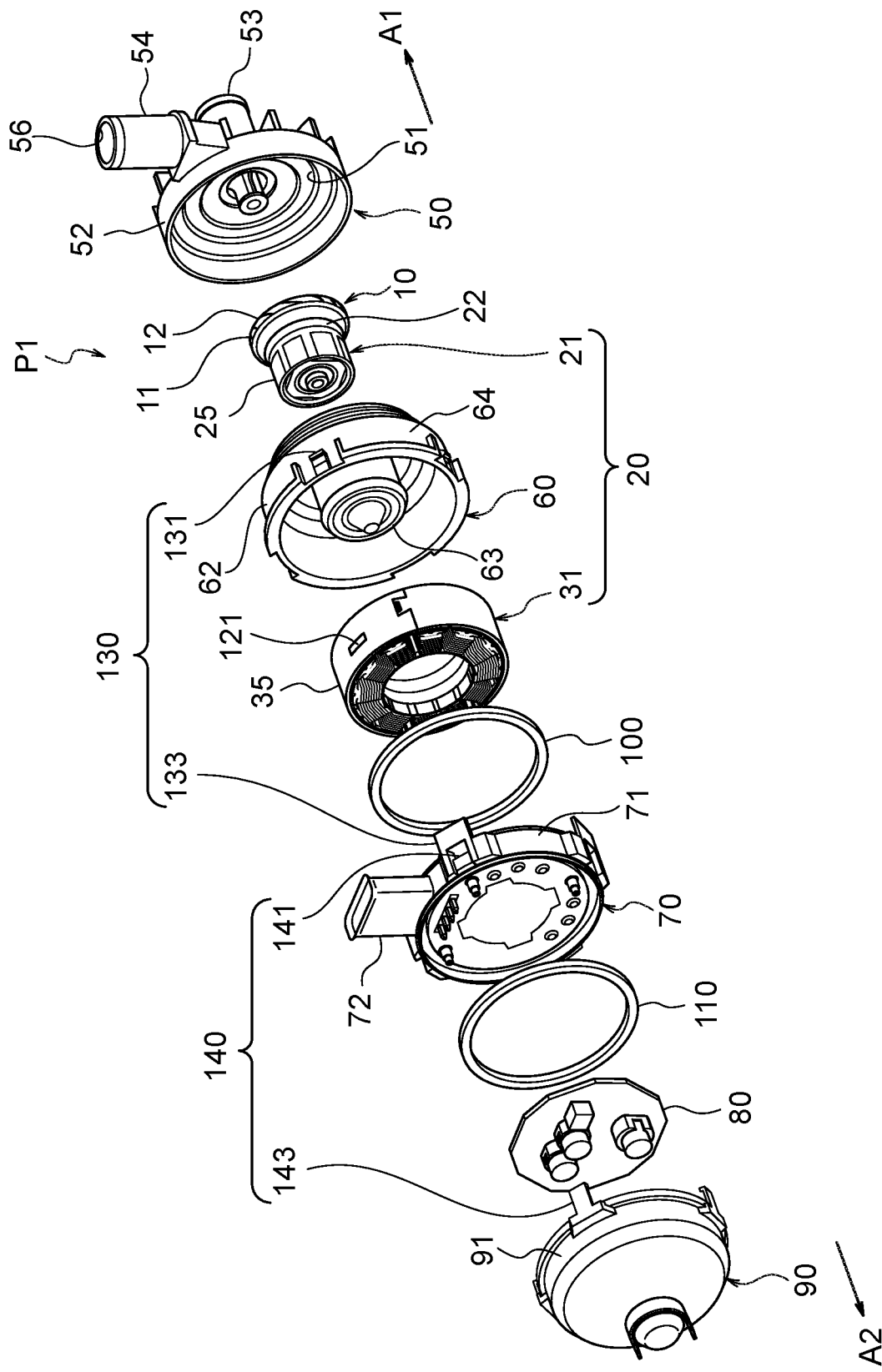
FIG. 4 is an exploded perspective view in which the electric pump of FIG. 1 is seen from the axial direction second side.

A first embodiment of the present disclosure is described first.

As shown in FIG. 1 through FIG. 5, an electric pump P1 relating to a first embodiment of the present disclosure has an impeller 10, a motor section 20, a pump housing 50, a motor housing 60, a supporting member 70, a circuit board 80, a substrate housing 90, a first gasket 100, and a second gasket 110. Arrow A1 indicates an axial direction first side of the electric pump P1, and arrow A2 indicates an axial direction second side of the electric pump P1.

The impeller 10 is disposed at the axial direction first side of a rotor 21 that is described later. This impeller 10 is made of resin as an example, and has plural blades 11 and a cover portion 12. The plural blades 11 extend in a spiral and radial form around the central portion of the impeller 10. The cover portion 12 is formed in the shape of an annular disc, and covers the plural blades 11 from the axial direction first side of the impeller 10. The impeller 10 is formed integrally of resin together with a rotor main body portion 22 of the rotor 21 that is described later, and, due thereto, the entire impeller 10 is fixed to the rotor 21.

The motor section 20 has the rotor 21, a stator 31 and a motor shaft 41. The rotor 21 has the rotor main body portion 22, a bearing 23, a rotor magnet 24, and a rotor core 25. The rotor main body portion 22 is made of resin, and is formed in the shape of a cylindrical tube. The bearing 23 is provided at the inner peripheral portion of the rotor main body portion 22, and the rotor core 25 is provided at the outer peripheral portion of the rotor main body portion 22. The rotor core 25 is a cylindrical tube structure of two layers that has an inner peripheral portion and an outer peripheral portion. The rotor magnet 24 is provided between the inner peripheral portion and the outer peripheral portion of the rotor core 25.

The rotor 21 is formed, on the whole, roughly in the shape of a cylindrical tube (roughly in the shape of a solid cylinder having a hole at the axially central portion thereof). The motor shaft 41 is inserted in the inner side of the bearing 23, and the rotor 21 is rotatably supported at the motor shaft 41. The rotor 21 (the rotor magnet 24) is disposed so as to face the stator 31, at the radial direction inner side of the stator 31 that is described hereinafter.

The stator 31 is provided at the radial direction outer side of the rotor 21. This stator 31 has a stator core 32, an insulator 33, a coil 34, and a stator yoke 35. The stator core 32 has plural tooth portions 36 that extend in a radial form. The insulator 33 is attached to the stator 31, and the coil 34 is wound on the tooth portions 36 via the insulator 33. The stator yoke 35 is formed in the shape of a tube, and the stator core 32 is press-fit into the inner side of the stator yoke 35. This stator 31 is formed roughly in an annular shape on the whole.

The pump housing 50 is disposed at the axial direction first side of the motor housing 60 that is described later. This pump housing 50 is formed in a concave form that opens toward the motor housing 60 side. The inner side of the pump housing 50 is formed as a pump chamber 51 that accommodates the impeller 10. The pump housing 50 is assembled to the motor housing 60 due to, for example, a peripheral wall portion 52 of the pump housing 50 being welded to a peripheral wall portion 62 of the motor housing 60 that is described later.

The pump housing 50 has an inlet pipe 53 and an outlet pipe 54. The inlet pipe 53 extends from the central portion of the pump housing 50 toward the side opposite the motor housing 60. The outlet pipe 54 extends from the outer side portion of the pump housing 50 in the direction tangent to the pump housing 50. An intake port 55 that communicates with the pump chamber 51 is formed in the inlet pipe 53. A discharge port 56 that communicates with the pump chamber 51 is formed in the outlet pipe 54.

The motor housing 60 is a two-layer structure having an inner tube portion 63 and an outer tube portion 64 that both are shaped as tubes that have bottoms. The outer tube portion 64 is formed at the radial direction outer side of the inner tube portion 63. The inner tube portion 63 opens at the pump housing 50 side, and the outer tube portion 64 opens at the side opposite the pump housing 50.

The rotor 21 is rotatably accommodated at the inner side of the inner tube portion 63. The stator 31 is accommodated between the inner tube portion 63 and the outer tube portion 64, in a state of being press-fit into the inner tube portion 63 and the outer tube portion 64. A shaft supporting portion 65, which is concave and opens toward the pump housing 50 side, is formed in the bottom wall portion of the inner tube portion 63. The motor shaft 41 is insert-molded in this shaft supporting portion 65. Note that the motor shaft 41 may be press-fit into the shaft supporting portion 65. The bottom wall portion of the outer tube portion 64 is connected to the opening side end portion of the inner tube portion 63.

The supporting member 70 is disposed at the side of the motor housing 60 which is opposite the pump housing 50. This supporting member 70 has a disc portion 71 that faces the motor housing 60 in the axial direction of the motor housing 60, and a connector portion 72 that projects-out toward the radial direction outer side of the disc portion 71 from a portion of the outer peripheral portion of the disc portion 71. There are cases in which the supporting member 70 is called a connector member because it has the connector portion 72. A connection terminal 73 is provided at the connector portion 72. A terminal portion 74 is formed integrally with this connection terminal 73.

The stator 31 is assembled to the supporting member 70 by first snap-fit structures 120 that are described in detail later. Further, the motor housing 60 is assembled to the supporting member 70 by second snap-fit structures 130 that are described in detail later. In this way, in the state in which the stator 31 and the motor housing 60 are assembled to the supporting member 70 by the first snap-fit structures 120 and the second snap-fit structures 130, the first gasket 100, which is an elastic member that is waterproofing and vibration-proofing, is interposed between the stator 31 and the motor housing 60, and the supporting member 70.

The circuit board 80 is disposed at the side of the disc portion 71 of the supporting member 70, which is opposite the motor housing 60. The circuit board 80 faces the disc portion 71 and is fixed to the disc portion 71. The final end portion of the coil 34 that extends from the stator 31 is connected to the circuit board 80. A motor driver for supplying electricity to the coil 34 of the stator 31, and control elements for controlling the motor driver, and the like are packaged on the circuit board 80. Further, the terminal portion 74 that extends from the connection terminal 73 is connected to the circuit board 80.

The substrate housing 90 is disposed at the side of the supporting member 70, which is opposite the motor housing 60. The substrate housing 90 is formed in a concave shape that opens toward the supporting member 70 side. The substrate housing 90 is assembled to the supporting member 70 by third snap-fit structures 140 that are described in detail later. In this way, in the state in which the substrate housing 90 is assembled to the supporting member 70 by the third snap-fit structures 140, the second gasket 110, which is an elastic member that is waterproofing and vibration-proofing in the same way as the first gasket 100, is interposed between the supporting member 70 and the substrate housing 90.

Note that the plural first snap-fit structures 120, the plural second snap-fit structures 130 and the plural third snap-fit structures 140 are provided at the electric pump P1. In the first embodiment, as an example, the first snap-fit structures 120 are provided at two places in the peripheral direction of the supporting member 70, and the second snap-fit structures 130 and the third snap-fit structures 140 are respectively provided at four places in the peripheral direction of the supporting member 70.

Further, at the electric pump P1, when electricity is supplied to the stator 31 by the circuit board 80, a rotating magnetic field is formed by the stator 31, and, due to rotating force being generated at the rotor 21 by this rotating magnetic field, the impeller 10 rotates together with the rotor 21. Further, when the impeller 10 rotates, fluid is drawn-in from the intake port 55 of the inlet pipe 53 and is delivered to the pump chamber 51, and the fluid that is delivered to the pump chamber 51 is discharged-out from the discharge port 56 of the outlet pipe 54.

Figure 5:
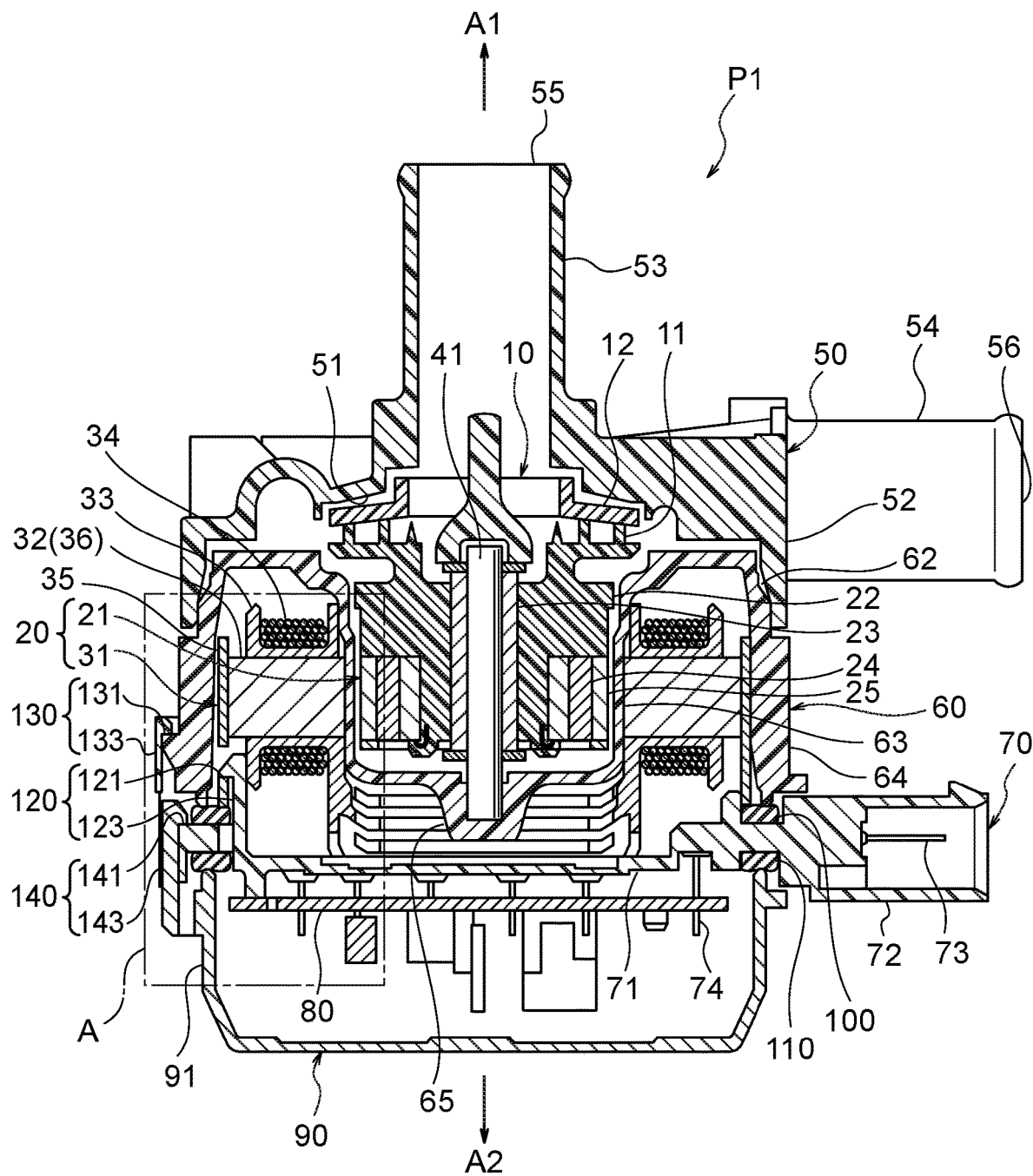
FIG. 5 is a vertical sectional view of the electric pump of FIG. 1.
Figure 6:
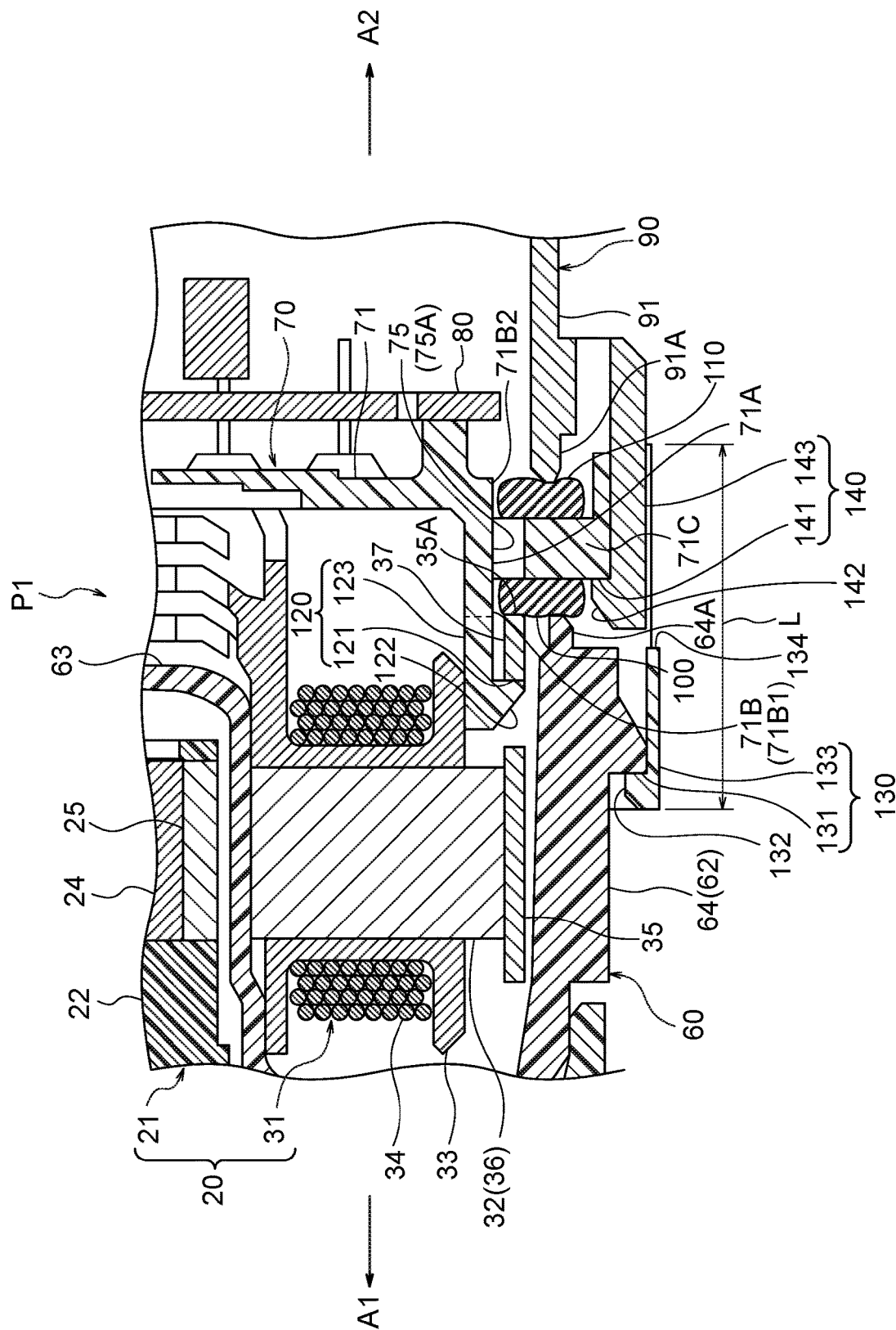
FIG. 6 is a drawing in which portion A of FIG. 5 is enlarged.

Details of the waterproofing structures that are formed by the first gasket 100 and the second gasket 110, and details of the assembly structures that are formed by the first snap-fit structures 120, the second snap-fit structures 130 and the third snap-fit structures 140, are described next with reference to FIG. 6. FIG. 6 is a drawing in which portion A of FIG. 5 is enlarged.

The disc portion 71 that is formed at the supporting member 70 more concretely has a cylindrical portion 71A that forms the peripheral wall portion of the disc portion 71, and an annular convex portion 71C that is formed at an outer peripheral surface 71B of this cylindrical portion 71A. The annular convex portion 71C is formed in an annular shape along the peripheral direction of the cylindrical portion 71A. The annular convex portion 71C is formed at the axial direction central portion of the outer peripheral surface 71B of the cylindrical portion 71A. Due to the annular convex portion 71C being formed at the axial direction central portion of the outer peripheral surface 71B of the cylindrical portion 71A, the outer peripheral surface 71B of the cylindrical portion 71A has an first outer peripheral surface 71B1, which is positioned at the motor housing 60 side of the annular convex portion 71C, and a second outer peripheral surface 71B2, which is positioned at the substrate housing side 90 of the annular convex portion 71C. A hole 75 is formed between the cylindrical portion 71A and the annular convex portion 71C by a portion of a mold at the time when a first anchored portion 122 of a first elastic piece 123 is molded by the mold. This hole 75 passes-through in the axial direction of the supporting member 70.

The stator yoke 35 and the outer tube portion 64 are positioned at the radial direction outer side of the cylindrical portion 71A (the first outer peripheral surface 71B1), and moreover, the outer tube portion 64 is positioned at the radial direction outer side of the stator yoke 35. Further, a peripheral wall portion 91 of the substrate housing 90 is positioned at the radial direction outer side of the cylindrical portion 71A (the second outer peripheral surface 71B2). End portions 35A, 64A, which are at the annular convex portion 71C side, of the stator yoke 35 and the outer tube portion 64 respectively face the annular convex portion 71C from the axial direction first side of the annular convex portion 71C. Further, an end portion 91A at the annular convex portion 71C side of the peripheral wall portion 91 of the substrate housing 90 respectively faces the annular convex portion 71C from the axial direction second side of the annular convex portion 71C.

The first gasket 100 is provided between the annular convex portion 71C, and the annular convex portion 71C side end portions 35A, 64A at the stator yoke 35 and the outer tube portion 64. This first gasket 100 is positioned at the radial direction outer side of the cylindrical portion 71A (the first outer peripheral surface 71B1).

The stator yoke 35 and the outer tube portion 64 are assembled to the disc portion 71 by the first snap-fit structures 120 and the second snap-fit structures 130. In this way, in the state in which the stator yoke 35 and the outer tube portion 64 are assembled to the disc portion 71, the first gasket 100 is interposed, in a state of being compressively deformed, between the annular convex portion 71C and the end portions 35A, 64A of the stator yoke 35 and the outer tube portion 64. Namely, due to the restraining forces of the first snap-fit structures 120 and the second snap-fit structures 130, the end portions 35A, 64A of the stator yoke 35 and the outer tube portion 64 are pushed against the first gasket 100.

The second gasket 110 is provided between the annular convex portion 71C, and the end portion 91A at the annular convex portion 71C side of the peripheral wall portion 91 of the substrate housing 90. This second gasket 110 is positioned at the radial direction outer side of the cylindrical portion 71A (the second outer peripheral surface 71B2).

The peripheral wall portion 91 of the substrate housing 90 is assembled to the disc portion 71 by the third snap-fit structures 140. In this way, in the state in which the peripheral wall portion 91 of the substrate housing 90 is assembled to the disc portion 71, the second gasket 110 is interposed, in a state of being compressively deformed, between the end portion 91A of the peripheral wall portion 91 and the annular convex portion 71C. Namely, due to the restraining forces of the third snap-fit structures 140, the end portion 91A of the peripheral wall portion 91 is pushed against the second gasket 110.

The first snap-fit structure 120 is structured by a first anchoring portion 121 that is formed at the stator yoke 35, and the first elastic piece 123 that is formed at the cylindrical portion 71A of the supporting member 70 and has the first anchored portion 122. A projecting portion 37, which projects-out further toward the supporting member 70 side than the stator core 32, is formed at the stator yoke 35, and the first anchoring portion 121 is formed at the projecting portion 37. This first anchoring portion 121 is, as an example, formed by the supporting member 70 side portion of the inner peripheral surface of a hole that passes-through in the radial direction of the stator yoke 35.

The first elastic piece 123 is formed at a peripheral direction portion of the cylindrical portion 71A, and extends from the cylindrical portion 71A toward the stator 31 side. The first anchored portion 122, which is shaped as a projection and projects-out toward the radial direction outer side of the cylindrical portion 71A, is formed at the distal end portion of the first elastic piece 123. The first elastic piece 123 is disposed at the inner sides of the first gasket 100 and the second gasket 110.

Further, the stator yoke 35 is assembled to the cylindrical portion 71A due to the first elastic piece 123 being inserted in the inner side of the stator yoke 35, and the first anchored portion 122 being anchored at the first anchoring portion 121 from the side of the first anchoring portion 121 which is opposite the cylindrical portion 71A. Further, due to the restraining forces of the first anchoring portion 121 and the first anchored portion 122, the end portion 35A of the stator yoke 35 is pushed against the first gasket 100.

The second snap-fit structure 130 is structured by a second anchoring portion 131 that is formed at the outer tube portion 64 of the motor housing 60, and a second elastic piece 133 that is formed at the annular convex portion 71C of the supporting member 70 and has a second anchored portion 132. The second anchoring portion 131 is formed at the outer peripheral surface of the outer tube portion 64. This second anchoring portion 131 is, as an example, formed by a projection that projects out toward the radial direction outer side from the outer peripheral surface of the outer tube portion 64.

The second elastic piece 133 is formed at the outer peripheral portion of the annular convex portion 71C. This second elastic piece 133 is formed at a peripheral direction portion of the annular convex portion 71C, and extends toward the motor housing 60 side from the outer peripheral portion of the annular convex portion 71C. The second anchored portion 132, which is shaped as a projection and projects-out toward the radial direction inner side of the annular convex portion 71C, is formed at the distal end portion of the second elastic piece 133. The second elastic piece 133 is disposed at the outer sides of the first gasket 100 and the second gasket 110.

Further, the outer tube portion 64 is assembled to the annular convex portion 71C due to the second elastic piece 133 being slid along the outer peripheral surface of the outer tube portion 64, and the second anchored portion 132 being anchored at the second anchoring portion 131 from the side of the second anchoring portion 131 which is opposite the annular convex portion 71C. Further, due to the restraining forces of the second anchoring portion 131 and the second anchored portion 132, the end portion 64A of the outer tube portion 64 is pushed against the first gasket 100.

The third snap-fit structure 140 is structured by a third anchoring portion 141 that is formed at the annular convex portion 71C of the supporting member 70, and a third elastic piece 143 that is formed at the peripheral wall portion 91 of the substrate housing 90 and has a third anchored portion 142. The third anchoring portion 141 is, as an example, formed by the motor housing 60 side end surface of the outer peripheral side of the annular convex portion 71C.

The third elastic piece 143 is formed at the outer peripheral surface of the peripheral wall portion 91 of the substrate housing 90. This third elastic piece 143 is formed at a peripheral direction portion of the peripheral wall portion 91, and extends toward the motor housing 60 side from this peripheral wall portion 91. The third anchored portion 142, which is shaped as a projection and projects-out toward the radial direction inner side of the peripheral wall portion 91, is formed at the distal end portion of the third elastic piece 143. The third elastic piece 143 is disposed at the outer sides of the first gasket 100 and the second gasket 110.

Further, the peripheral wall portion 91 is assembled to the annular convex portion 71C due to the third elastic piece 143 being slid along the outer peripheral surface of the annular convex portion 71C, and the third anchored portion 142 being anchored at the third anchoring portion 141 from the side of the third anchoring portion 141 which is opposite the annular convex portion 71C. Further, by the restraining forces of the third anchoring portion 141 and the third anchored portion 142, the end portion 91A of the peripheral wall portion 91 is pushed against the second gasket 110.

Further, a cut-out portion 134, which of a shape that is cut-out from the substrate housing 90 side, is formed in the above-described second elastic piece 133. The cut-out portion 134 and the third anchoring portion 141 are at the same position in the peripheral direction of the supporting member 70. In the state in which the third elastic piece 143 is inserted in the inner side of the cut-out portion 134, the third anchored portion 142 is anchored at the third anchoring portion 141.

Further, the first elastic piece 123 is disposed further toward the radial direction inner side of the supporting member 70 than the second elastic piece 133 and the third elastic piece 143. Further, the first anchoring portion 121, the first anchored portion 122, the second anchoring portion 131, the second anchored portion 132, the third anchoring portion 141 and the third anchored portion 142 are disposed within a range L in the length direction of the second elastic piece 133 that runs along the axial direction of the supporting member 70.

Operation and effects of the first embodiment are described next.

As described in detail above, in accordance with the electric pump P1 relating to the first embodiment, the first gasket 100 is interposed between the stator 31 and the motor housing 60, and the supporting member 70, and the second gasket 110 is interposed between the supporting member 70 and the substrate housing 90. Accordingly, water entering-in from between the stator 31 and the motor housing 60, and the supporting member 70, and from between the supporting member 70 and the substrate housing 90, can be obstructed by the first gasket 100 and the second gasket 110. Due thereto, the waterproof performance can be ensured.

Further, as described above, because the first gasket 100 is interposed between the stator 31 and the motor housing 60, and the supporting member 70, and the second gasket 110 is interposed between the supporting member 70 and the substrate housing 90, even if vibrations, which are generated at the stator 31 at the time when the motor section 20 operates, are transmitted to the motor housing 60, these vibrations can be absorbed by the first gasket 100 and the second gasket 110. Due thereto, a low vibration performance can be ensured.

Moreover, the first snap-fit structures 120 are provided at the stator 31 and the supporting member 70, and the second snap-fit structures 130 are provided at the motor housing 60 and the supporting member 70, and the third snap-fit structures 140 are provided at the supporting member 70 and the substrate housing 90.

Further, at the first snap-fit structure 120, due to the first anchored portion 122 of the first elastic piece 123 that is formed at the supporting member 70 being anchored at the first anchoring portion 121 that is formed at the stator 31, the stator 31 is assembled to the supporting member 70.

Further, at the second snap-fit structure 130, due to the second anchored portion 132 of the second elastic piece 133 that is formed at the supporting member 70 being anchored at the second anchoring portion 131 that is formed at the motor housing 60, the motor housing 60 is assembled to the supporting member 70.

Moreover, at the third snap-fit structure 140, due to the third anchored portion 142 of the third elastic piece 143 that is formed at the substrate housing 90 being anchored at the third anchoring portion 141 that is formed at the supporting member 70, the substrate housing 90 is assembled to the supporting member 70.

In this way, the stator 31, the motor housing 60 and the substrate housing 90 can be assembled to the supporting member 70 by using the first snap-fit structures 120, the second snap-fit structures 130 and the third snap-fit structures 140, and therefore, assembly can be made to be easy.

Moreover, as described above, the first gasket 100 is interposed between the stator 31 and the motor housing 60, and the supporting member 70, and the second gasket 110 is interposed between the supporting member 70 and the substrate housing 90. Accordingly, due to the elastic forces of the first gasket 100 and the second gasket 110, loads are applied in directions in which the anchoring forces (hooking forces) increase, between the first anchoring portion 121 and the first anchored portion 122, and between the second anchoring portion 131 and the second anchored portion 132, and between the third anchoring portion 141 and the third anchored portion 142. Due thereto, rattling of the members after assembly, and in other words and more specifically, rattling of the stator 31, the supporting member 70, the motor housing 60 and the substrate housing 90, can be suppressed.

Further, in accordance with the electric pump P1 relating to the first embodiment, the cut-out portion 134 that is formed in the second elastic piece 133, and the third anchoring portion 141 are at the same position in the peripheral direction of the supporting member 70. In the state in which the third elastic piece 143 is inserted in the inner side of the cut-out portion 134, the third anchored portion 142 is anchored at the third anchoring portion 141. Accordingly, because the second snap-fit structure 130 and the third snap-fit structure 140 can be gathered at the same place in the peripheral direction of the supporting member 70, the structure of the outer peripheral portion of the electric pump P1 can be made to be simple as compared with a case in which, for example, the second snap-fit structure 130 and the third snap-fit structure 140 are respectively provided at different places in the peripheral direction of the supporting member 70. Further, by placing the second snap-fit structure 130 and the third snap-fit structure 140 in series, the electric pump P1 bulges-out toward the outer side of the electric pump P1 by approximately the amount corresponding to the volume of only the second snap-fit structure 130, and an increase in the radial direction build of the electric pump P1 can be suppressed.

Further, in accordance with the electric pump P1 relating to the first embodiment, the first elastic piece 123 is disposed further toward the radial direction inner side of the supporting member 70 than the second elastic piece 133 and the third elastic piece 143. The first anchoring portion 121, the first anchored portion 122, the second anchoring portion 131, the second anchored portion 132, the third anchoring portion 141 and third anchored portion 142 are disposed within the range L in the length direction of the second elastic piece 133. Accordingly, the electric pump P1 can be made to be compact in the axial direction as compared with a case in which, for example, the first elastic piece 123 is formed so as to be lined-up with the second elastic piece 133 and the third elastic piece 143 in the axial direction of the supporting member 70, and the first anchoring portion 121 and the first anchored portion 122 are outside of the range L in the length direction of the second elastic piece 133. Moreover, due to the first elastic piece 123 being positioned further toward the radial direction inner side than the second elastic piece 133 and the third elastic piece 143, the second elastic piece 133 and the third elastic piece 143 can be disposed so as to be lined-up in the axial direction, and for this reason as well, the electric pump P1 can be made to be compact in the axial direction.

Modified examples of the first embodiment are described next.

In the above-described embodiment, the second snap-fit structure 130 and the third snap-fit structure 140 are more preferably provided at the same position in the peripheral direction of the supporting member 70, but may be provided at different positions in the peripheral direction of the supporting member 70.

Further, in the above-described embodiment, the first anchoring portion 121, the first anchored portion 122, the second anchoring portion 131, the second anchored portion 132, the third anchoring portion 141 and the third anchored portion 142 are more preferably disposed within the range L in the length direction of the second elastic piece 133, but do not have to be structured in this way. For example, the third anchoring portion 141 and the third anchored portion 142 may be disposed outside of the range L in the length direction of the second elastic piece 133.

Further, the plural combinations of the first snap-fit structures 120, the second snap-fit structures 130 and the third snap-fit structures 140 may be such that they are disposed in four sets at pitches of 90° or in three sets at pitches of 120° in the peripheral direction. Further, the plural combinations of the first snap-fit structures 120, the second snap-fit structures 130 and the third snap-fit structures 140 may be such that they are disposed non-uniformly in the peripheral direction, or the like.

Second Embodiment

A second embodiment of the present disclosure is described next.

Figure 7:
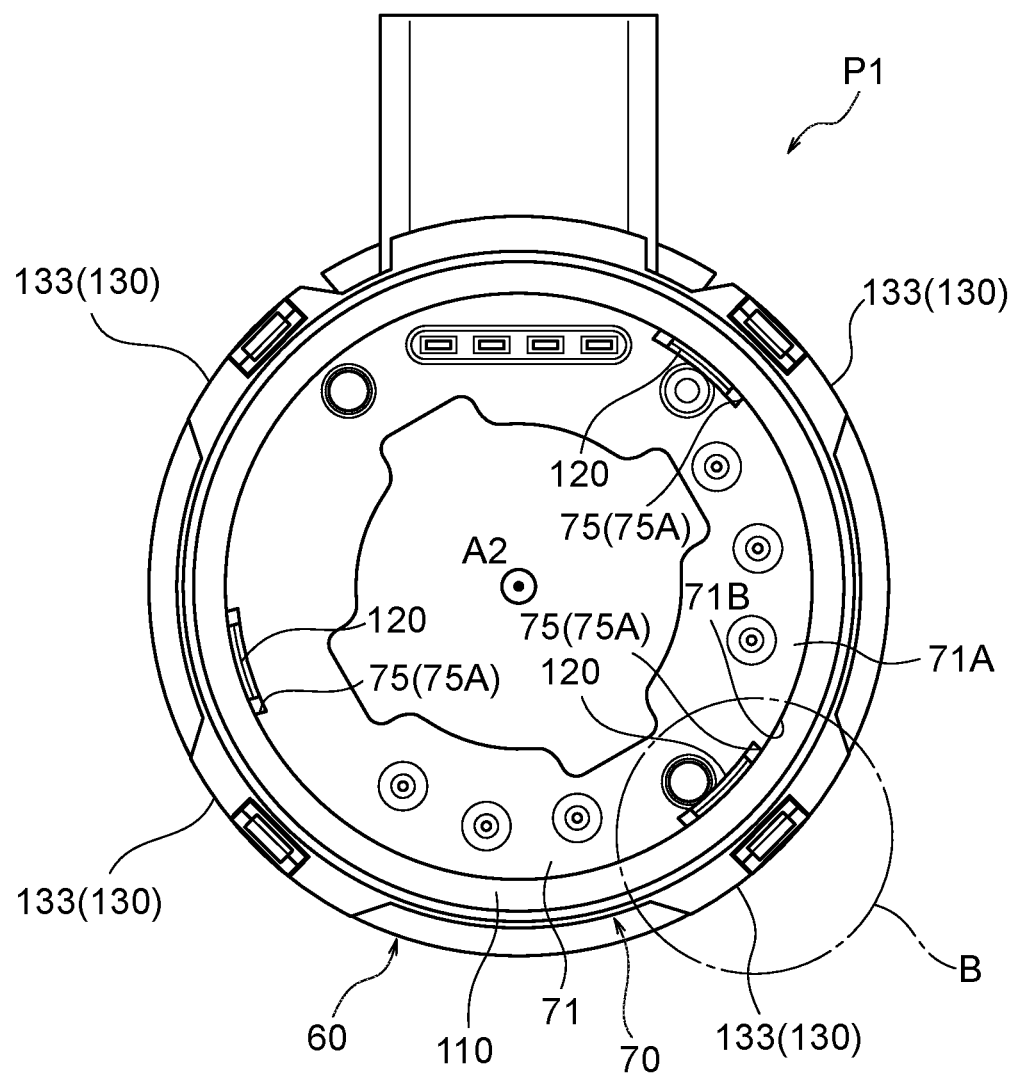
FIG. 7 is a drawing in which the electric pump relating to the first embodiment is seen from the axial direction second side in a state in which a circuit board and a substrate housing are removed from the electric pump.

The second embodiment of the present disclosure relates to an improvement on the above-described first embodiment. First, the point that requires a first improvement in the above-described first embodiment is described. FIG. 7 is a drawing in which the electric pump P1 relating to the first embodiment is seen from the axial direction second side in a state in which the circuit board 80 and the substrate housing 90 are removed from the electric pump P1.

Figure 8:
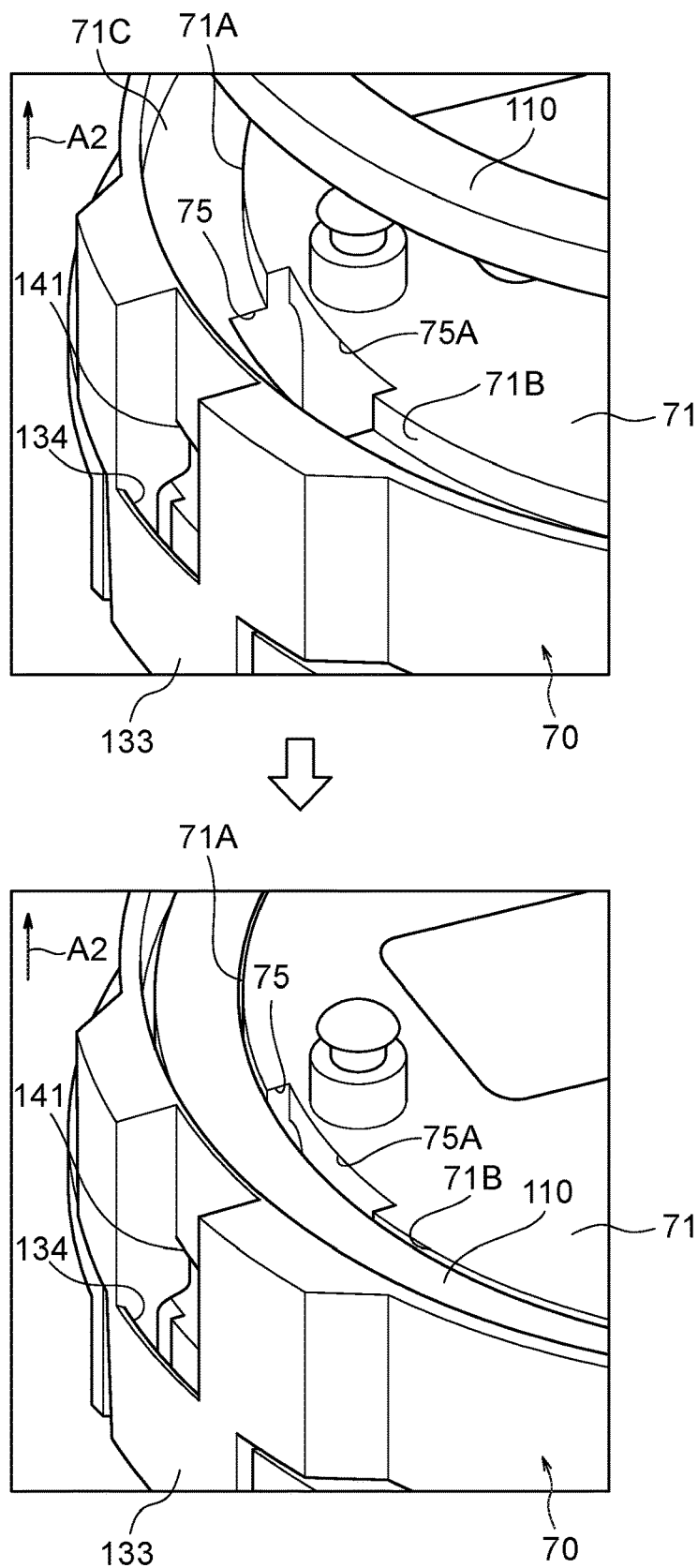
FIG. 8 is a drawing showing a state in which a second gasket is mounted to a supporting member, at portion B of FIG. 7.

Note that, in the first embodiment, as an example, the first snap-fit structures 120 are provided at two places in the peripheral direction of the supporting member 70. However, in the example of FIG. 7, the first snap-fit structures 120 are provided at three places in the peripheral direction of the supporting member 70. FIG. 8 is a drawing showing a state in which the second gasket 110 is mounted to the supporting member 70, at portion B of FIG. 7.

As shown in FIG. 7 and FIG. 8, the hole 75 is formed in the disc portion 71 of the supporting member 70, by a portion of a mold at the time when the above-described first anchored portion 122 of the first elastic piece 123 is molded by the mold. This hole 75 passes-through in the axial direction of the supporting member 70. Further, a portion of the hole 75 is positioned further toward the radial direction inner side than the outer peripheral surface 71B of the cylindrical portion 71A. Therefore, a concave portion 75A that passes-through in the axial direction of the supporting member 70 is formed in the outer peripheral surface 71B.

The above-described inner peripheral surface (see FIG. 6) of the first gasket 100 and inner peripheral surface of the second gasket 110 are provided so as to be fit tightly to the outer peripheral surface 71B. However, because the concave portion 75A is not blocked-off by the first gasket 100 and the second gasket 110, there is the concern that foreign matter may move from the inner side space (the motor chamber) of the outer tube portion 64 through this concave portion 75A (refer to FIG. 6 through FIG. 8) into the inner side space (the circuit chamber) of the substrate housing 90.

Thus, the first improvement is implemented in the second embodiment. The first improvement is described hereinafter.

Figure 9:
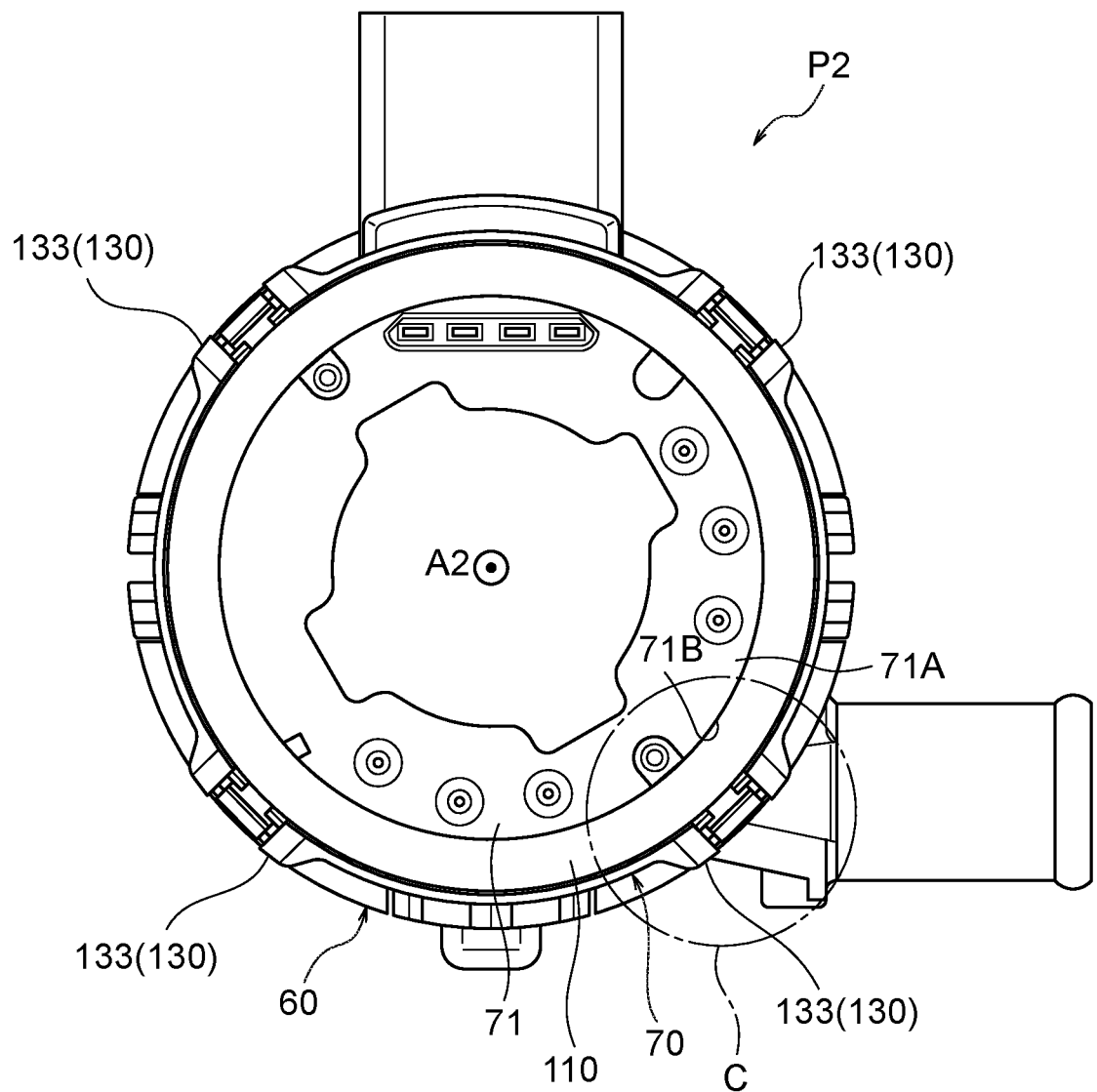
FIG. 9 is a drawing in which an electric pump relating to a second embodiment is seen from the axial direction second side in a state in which the circuit board and the substrate housing are removed from the electric pump.
Figure 10:
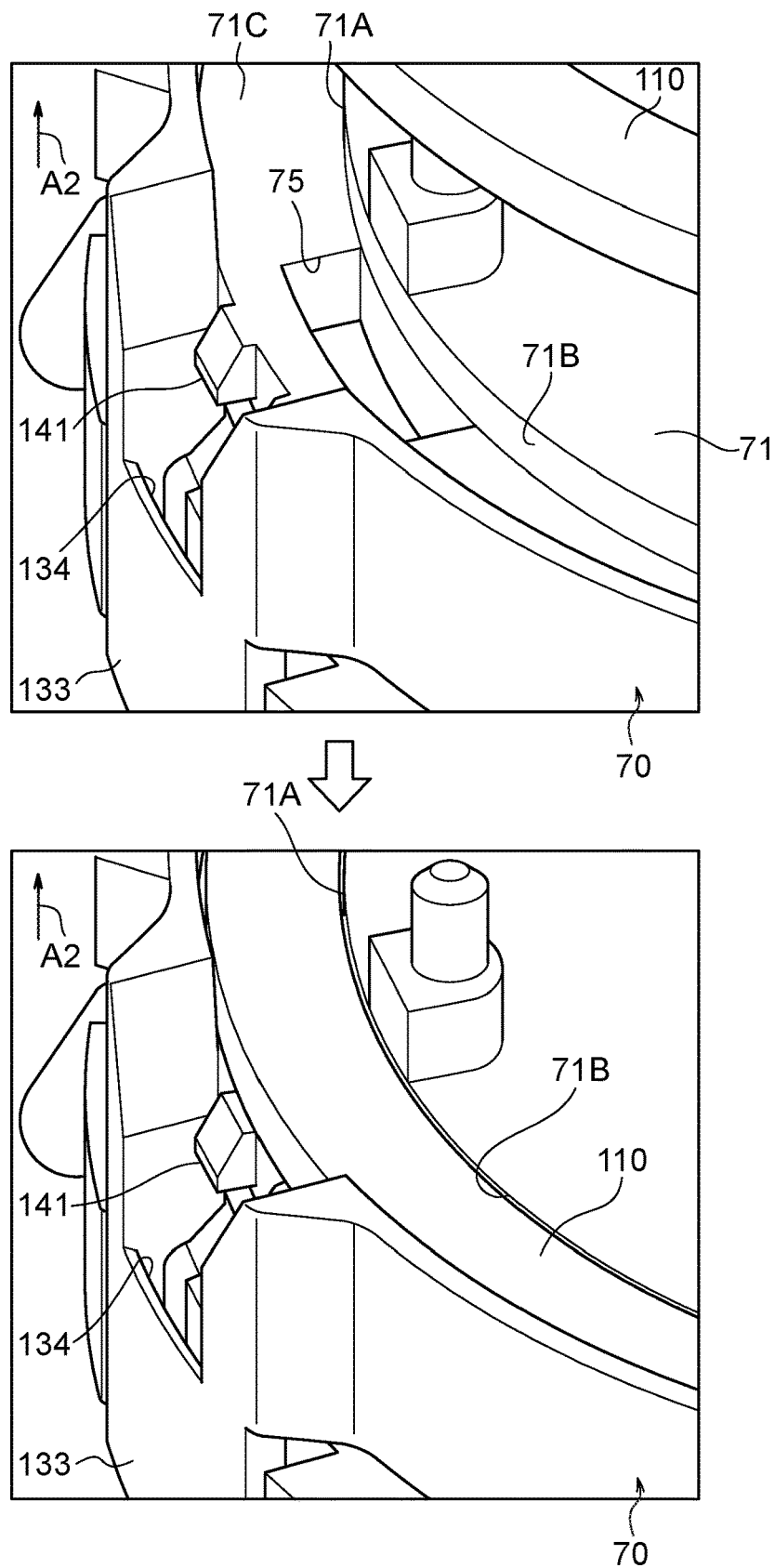
FIG. 10 is a drawing showing a state in which the second gasket is mounted to the supporting member, at portion C of FIG. 9.

FIG. 9 is a drawing in which an electric pump P2 relating to the second embodiment is viewed from the axial direction second side in a state in which the circuit board 80 and the substrate housing 90 are removed from the electric pump P2. FIG. 10 is a drawing showing a state in which the second gasket 110 is mounted to the supporting member 70, at portion C of FIG. 9.

Figure 11:
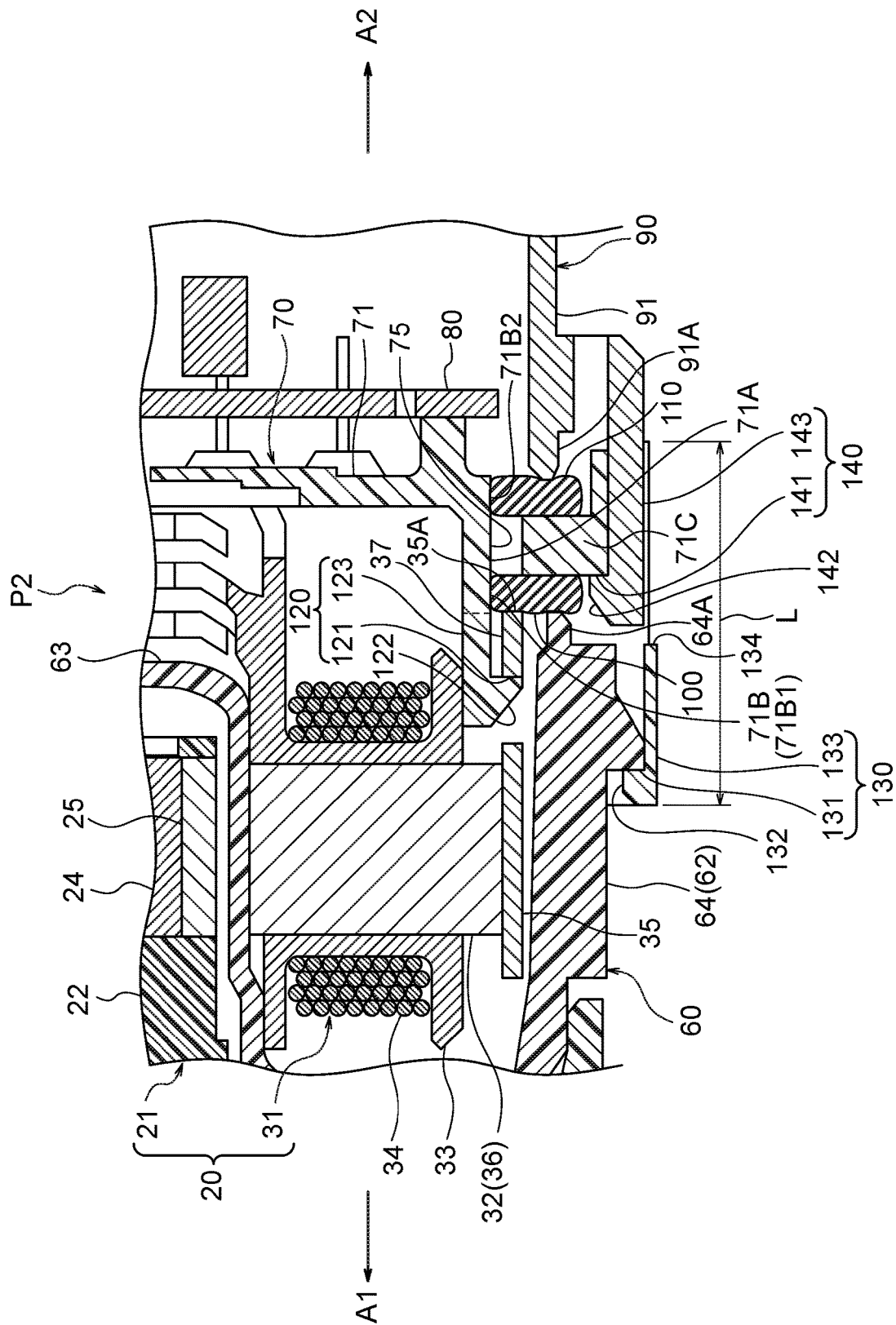
FIG. 11 is a cross-sectional view of a portion, which corresponds to FIG. 6, of the electric pump relating to the second embodiment.

As shown in FIG. 9 and FIG. 10, in the first improvement, the diameter of the outer peripheral surface 71B of the cylindrical portion 71A is reduced up to the point that the above-described concave portion 75A (refer to FIG. 7 and FIG. 8) disappears. The hole 75 is formed at a position contacting the outer peripheral surface 71B of the cylindrical portion 71A. Further, due thereto, the concave portion 75A is eliminated. FIG. 11 is a cross-sectional view of the portion corresponding to FIG. 6 at the electric pump P2 relating to the second embodiment.

As shown in FIG. 11, in the second embodiment, the inner diameters of the first gasket 100 and the second gasket 110 also are reduced in accordance with the reduction in diameter of the outer peripheral surface 71B of the cylindrical portion 71A. Further, due thereto, the inner peripheral surface of the first gasket 100 and the inner peripheral surface of the second gasket 110 fit tightly to the outer peripheral surface 71B of the cylindrical portion 71A over the entire periphery. Accordingly, in accordance with this first improvement, foreign matter moving from the inner side space (the motor chamber) of the outer tube portion 64 along the outer peripheral surface 71B of the cylindrical portion 71A into the inner side space (the circuit chamber) of the substrate housing 90 can be inhibited by the first gasket 100 and the second gasket 110.

Because the widths of the first gasket 100 and the second gasket 110 are large as compared with in the first embodiment, the waterproofing performance and the vibration-proofing performance by the first gasket 100 and the second gasket 110 can be improved. Further, the stability between the motor housing 60 and the stator 31, and the supporting member 70, and the stability between the supporting member 70 and the substrate housing 90, respectively can be improved.

Figure 12:
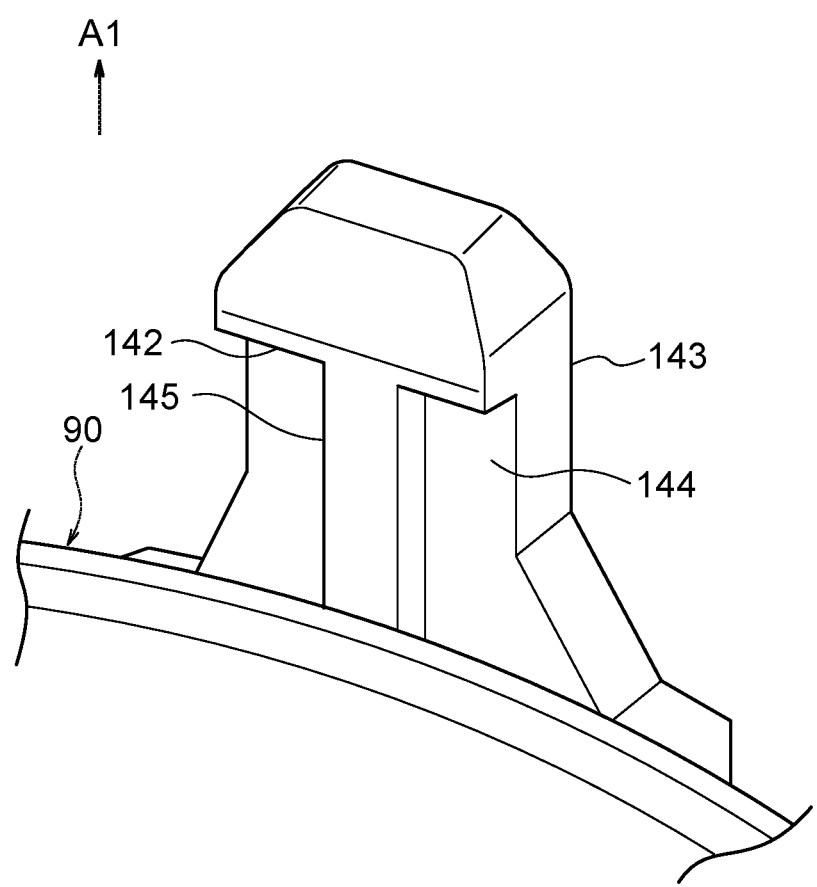
FIG. 12 is a perspective view of a third elastic piece at the electric pump relating to the second embodiment.
Figure 13:
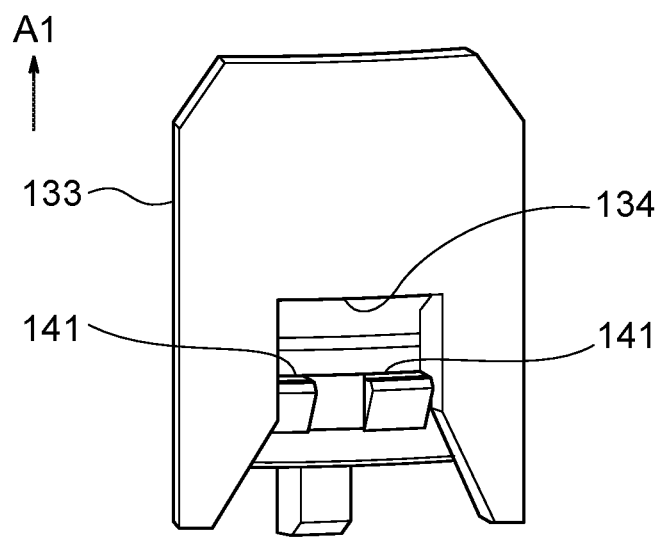
FIG. 13 is a perspective view showing a state in which a third anchored portion of the third elastic piece at the electric pump relating to the second embodiment is anchored at a third anchoring portion.
Figure 13:
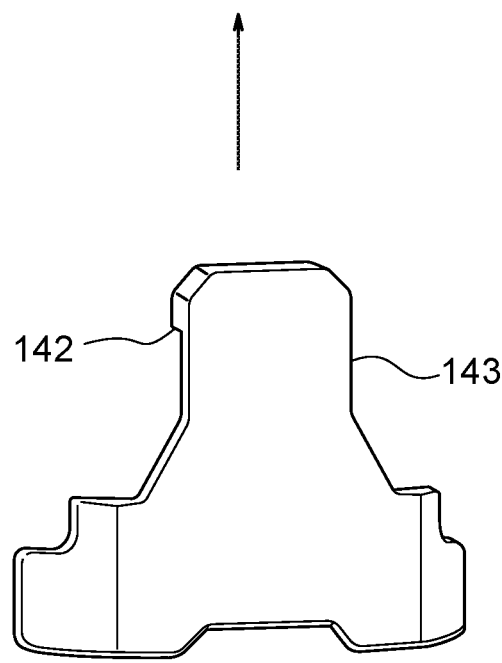

Next, the point that requires a second improvement in the above-described first embodiment is described. FIG. 12 is a perspective view of the third elastic piece 143 at the electric pump P2 relating to the second embodiment. FIG. 13 is a perspective view showing a state in which the third anchored portion 142 of the third elastic piece 143 is anchored at the third anchoring portion 141 at the electric pump P2 of the second embodiment. FIG. 12 and FIG. 13 are drawings showing the second embodiment in which the second improvement has been carried out, but the point that requires the second improvement in the first embodiment is described by using FIG. 12 and FIG. 13.

In the above-described first embodiment, the third elastic piece 143 is structured by only a vertical wall portion 144 and the third anchored portion 142 that is formed at the peak portion of this vertical wall portion 144. However, if the third elastic piece 143 is structured in this way, there is the concern that the vertical wall portion 144 will deform so as to warp toward the outer side due to the reaction forces of the first gasket 100 and the second gasket 110, and that the fixing performance of the third snap-fit structure 140 (see FIG. 6) will be impaired.

Thus, it has been thought to provide a pair of ribs that extend in the height direction of the vertical wall portion 144 at the both sides in the width direction of the vertical wall portion 144, and to connect the upper ends of this pair of ribs to the third anchored portion 142 and reinforce the vertical wall portion 144. If the third elastic piece 143 is structured in this way, the vertical wall portion 144 deforming so as to warp toward the outer side due the reaction forces of the first gasket 100 and the second gasket 110 can be suppressed, and therefore, the fixing performance of the third snap-fit structure 140 can be ensured. However, the size of the third elastic piece 143 increases due to the pair of ribs.

Thus, the second improvement is implemented in the second embodiment. The second improvement is described hereinafter. As shown in FIG. 12, in this second improvement, a rib 145 that extends in the height direction of the vertical wall portion 144 is formed at the central portion in the width direction of the vertical wall portion 144, and the vertical wall portion 144 is reinforced by connecting the upper end of this rib 145 to the third anchored portion 142. By forming this structure in this way, the vertical wall portion 144 deforming so as to warp toward the outer side due to the reaction forces of the first gasket 100 and the second gasket 110 can be suppressed, while the size of the third elastic piece 143 becoming larger is suppressed. Therefore, the fixing performance of the third snap-fit structure 140 can be ensured.

Note that, in this second improvement, in consideration of the moldability of the third elastic piece 143, the projecting height of the rib 145 with respect to the vertical wall portion 144 is made to coincide with the projecting height of the third anchored portion 142 with respect to the vertical wall portion 144. Further, as shown in FIG. 13, two of the third anchoring portions 141 are formed so as to be lined-up, in correspondence with the rib 145 being formed at the central portion in the width direction of the vertical wall portion 144. Due thereto, the third anchored portion 142 can be anchored at the two third anchoring portions 141.

Although a first embodiment and a second embodiment of the present disclosure have been described above, the present disclosure is not limited to the above, and, other than the above, can of course be implemented by being modified in various ways within a scope that does not depart from the gist thereof.

The disclosure of Japanese Patent Application No. 2018-038295 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. An electric pump comprising:
an impeller;
a motor section having a rotor that is fixed to the impeller, and a stator that is provided at a radial direction outer side of the rotor;
a pump housing having a pump chamber that accommodates the impeller;
a motor housing having an inner tube portion that accommodates the rotor at an inner side, and an outer tube portion that is formed at a radial direction outer side of the inner tube portion and accommodates the stator between the inner tube portion and the outer tube portion;
a supporting member that is disposed at a side of the motor housing which is opposite the pump housing;
a circuit board that is disposed at a side of the supporting member which is opposite the motor housing;

a substrate housing that is disposed at the side of the supporting member which is opposite the motor housing, and that accommodates the circuit board;

a first gasket that is interposed between the stator and the motor housing, and the supporting member;

a second gasket that is interposed between the supporting member and the substrate housing;

a first snap-fit structure having a first anchoring portion that is formed at the stator, and a first elastic piece that is formed at the supporting member and has a first anchored portion that is anchored at the first anchoring portion;

a second snap-fit structure having a second anchoring portion that is formed at the motor housing, and a second elastic piece that is formed at the supporting member and has a second anchored portion that is anchored at the second anchoring portion; and a third snap-fit structure having a third anchoring portion that is formed at the supporting member, and a third elastic piece that is formed at the substrate housing and has a third anchored portion that is anchored at the third anchoring portion.

2. The electric pump of claim 1, wherein:

a cut-out portion, which is a shape of being cut-out from a substrate housing side, is formed in the second elastic piece, the cut-out portion and the third anchoring portion are at a same position in a peripheral direction of the supporting member, and the third anchored portion is anchored at the third anchoring portion in a state in which the third elastic piece is inserted in an inner side of the cut-out portion.

3. The electric pump of claim 2, wherein:

the first elastic piece is disposed further toward a radial direction inner side of the supporting member than the second elastic piece and the third elastic piece, and the first anchoring portion, the first anchored portion, the second anchoring portion, the second anchored portion, the third anchoring portion and the third anchored portion are disposed within a range in a length direction of the second elastic piece that runs along an axial direction of the supporting member.

4. The electric pump of claim 1, wherein:

the stator has a stator core, and a stator yoke, the stator core being press-fit into an inner side of the stator yoke, the supporting member has a cylindrical portion, and an annular convex portion that is formed at an outer peripheral surface of the cylindrical portion, the stator yoke, the outer tube portion, and a peripheral wall portion of the substrate housing are positioned at a radial direction outer side of the cylindrical portion, the stator yoke and the outer tube portion face the annular convex portion from an axial direction first side of the annular convex portion, the peripheral wall portion faces the annular convex portion from an axial direction second side of the annular convex portion, the first gasket is interposed between the stator yoke and the outer tube portion, and the annular convex portion, the second gasket is interposed between the peripheral wall portion and the annular convex portion, and an inner peripheral surface of the first gasket and an inner peripheral surface of the second gasket are respectively fit tightly to the outer peripheral surface of the cylindrical portion over an entire periphery.

* * * * *